United States Patent
Bos

(10) Patent No.: US 9,055,210 B2
(45) Date of Patent: Jun. 9, 2015

(54) DEVICE FOR DETECTING A CAMERA OBSTRUCTION

(71) Applicant: RESEARCH IN MOTION LIMITED, Waterloo (CA)

(72) Inventor: Jeffrey Charles Bos, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 32 days.

(21) Appl. No.: 13/921,248

(22) Filed: Jun. 19, 2013

(65) Prior Publication Data

US 2014/0375835 A1 Dec. 25, 2014

(51) Int. Cl.
*H04N 5/228* (2006.01)
*H04N 5/232* (2006.01)

(52) U.S. Cl.
CPC ........... *H04N 5/232* (2013.01); *H04N 5/23245* (2013.01)

(58) Field of Classification Search
CPC ............. H04N 5/23219; H04N 5/23249
USPC ................... 348/208.14, 222.1, 239
See application file for complete search history.

(56) References Cited

U.S. PATENT DOCUMENTS

| 5,210,560 | A | 5/1993 | Labaziewicz |
| 7,920,179 | B2* | 4/2011 | Thorn ........................... 348/239 |
| 8,553,134 | B2* | 10/2013 | Shimizu ........................ 348/345 |
| 2004/0012682 | A1 | 1/2004 | Kosaka et al. |
| 2007/0201725 | A1 | 8/2007 | Steinberg et al. |
| 2011/0085073 | A1* | 4/2011 | Park ............................... 348/349 |
| 2012/0111945 | A1* | 5/2012 | Kearney .................... 235/462.11 |
| 2012/0262569 | A1 | 10/2012 | Cudak et al. |

FOREIGN PATENT DOCUMENTS

| GB | 2408887 A | 6/2005 |
| JP | 2010-114760 A | 5/2010 |
| WO | 2012147368 A1 | 11/2012 |

OTHER PUBLICATIONS

Fujifilm Corporation (Tokyo, Japan), Fujifilm Digital Finepix Real 3D W3 Digital Camera Owner's manual Published Aug. 1, 2009 Accessed May 6, 2013.
Corresponding European Patent Application No. 131727851 Search Report dated Nov. 28, 2013.

* cited by examiner

*Primary Examiner* — Gevell Selby
(74) *Attorney, Agent, or Firm* — Perry + Currier Inc.

(57) ABSTRACT

A device for detecting a camera obstruction is provided. The device includes: a camera device; and, a processor configured to: when a first electronic image acquired by the camera device comprises given data, automatically control the camera device to acquire one or more second electronic images.

17 Claims, 9 Drawing Sheets

DEVICE FOR DETECTING A CAMERA OBSTRUCTION

FIELD

The specification relates generally to devices, and specifically to a device for detecting a camera obstruction.

BACKGROUND

The evolution of computers is currently quite active in the mobile device environment. Cameras are increasingly being integrated into mobile devices. However, the placement of the camera lens, and the general size of mobile devices and the lenses, often lead to the lens being obstructed when the mobile device is being held.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
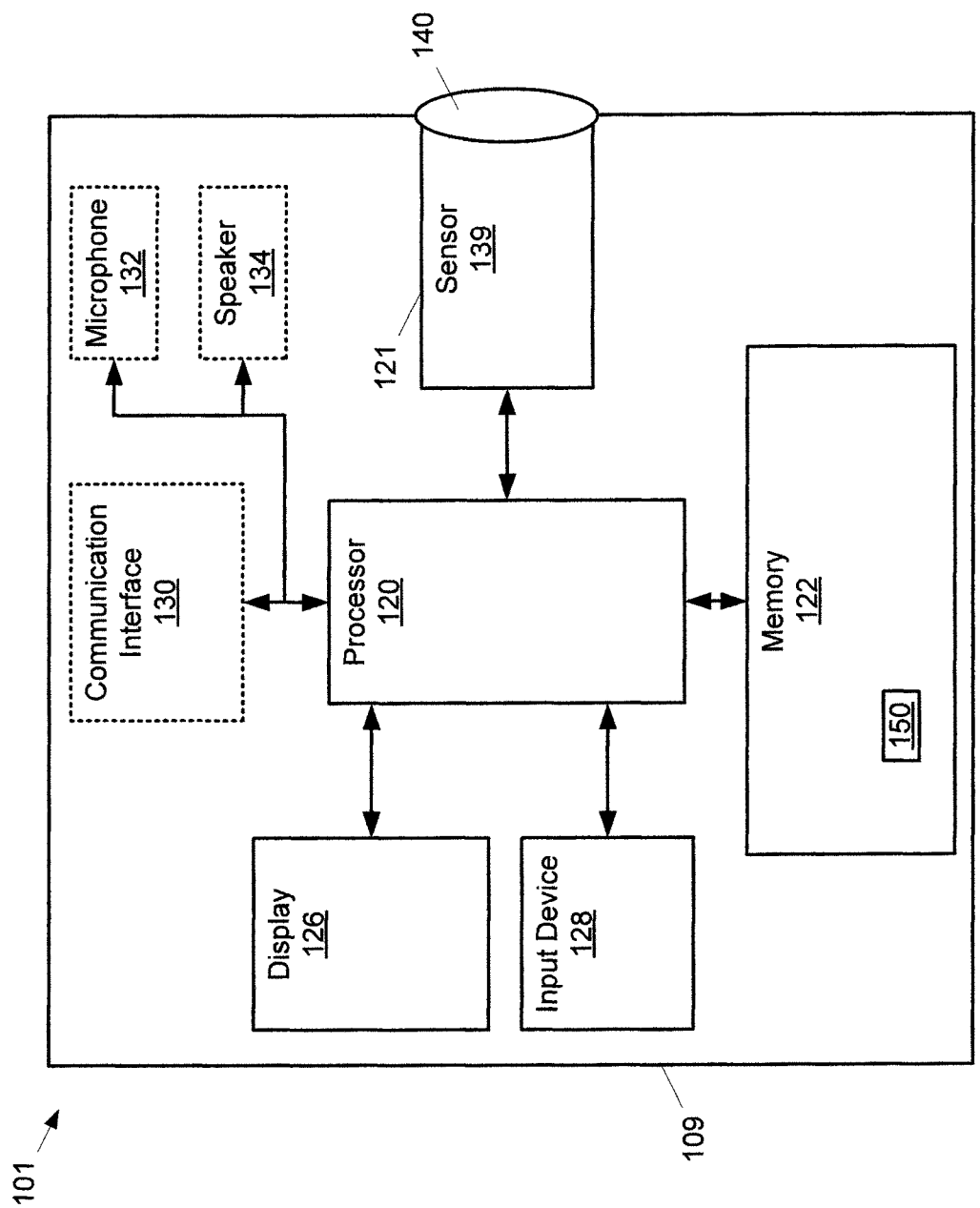
FIG. 1 depicts a schematic diagram of a device for detecting a camera obstruction, according to non-limiting implementations.

In general, this disclosure is directed to a device, and in particular a mobile electronic device, with a camera device integrated therein. In general, mobile electronic devices represent electronic devices that are readily movable from place to place. Camera devices are increasingly being integrated into mobile electronic devices. However, the lenses are generally small and/or do not protrude from the mobile electronic device; in other words, the lens of a camera device integrated into a mobile electronic device is generally flush with a housing of the mobile electronic device. This can lead to the lens being obstructed and/or blocked when images are being acquired using the camera device as there is no overt tactile indication of the position of the lens. This specification hence describes various implementations of a device that can detect camera obstruction and further respond to the camera obstruction.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In this specification, elements may be described as "obstructed", "obscured" and/or "exposed". In general, an element that is obstructed and/or obscured is one or more of not visible to a user, not viewable, covered, blocked, concealed, hidden, and the like. Similarly, an element that is exposed is one or more of visible to a user, uncovered, revealed, viewable, and the like.

In this specification, elements may be described as acquiring an electronic image, for example a camera device and/or a sensor at a camera device. In general, an element that can acquire an electronic image can one or more of acquire the electronic image, capture the electronic image, "take" the electronic image, and the like. Further, acquiring and/or capturing an electronic image does not necessarily include storing the electronic image, except where specified.

An aspect of the specification provides a device comprising: a camera device; and, a processor configured to: when a first electronic image acquired by the camera device comprises given data, automatically control the camera device to acquire one or more second electronic images.

The processor can be further configured to: analyze further electronic images acquired by the camera device after the first electronic image is acquired and before the one or more second electronic images are acquired; and, when the first electronic image further comprises the given data and at least one of the further electronic images no longer comprises the given data, automatically control the camera device to acquire the one or more second electronic images.

The processor can be further configured to automatically control the camera device to acquire the one or more second electronic images by one or more of: acquiring a burst of electronic images; and, placing the camera device in a burst mode.

The processor can be further configured to automatically control the camera device to acquire the one or more second electronic images by one or more of: acquiring a video; and, placing the camera device in a video mode.

The given data can comprise one or more of: image data indicative that the camera device is obscured; an electronic image of a finger; a given range of colours; a given luminance level; and, one or more of a given percentage and a given portion of the first electronic image.

The device can further comprise a memory, wherein the processor can be further configured to store at least one of the one or more second electronic images at the memory. The processor can be further configured to automatically delete the first electronic image at the memory when previously stored therein.

The device can further comprise a notification device, wherein the processor can be further configured to control the notification device to provide a notification when the first electronic image comprising the given data is acquired.

The device can further comprise a display, wherein the processor can be further configured to visually identify the given data in the first electronic image.

The device can further comprise an input device, wherein the processor can be further configured to control the camera device to acquire the first electronic image when input is received at the input device.

Another aspect of the specification provides a method comprising; when a first electronic image acquired by a camera device, at a device comprising the camera device and a processor, comprises given data, automatically controlling the camera device, using the processor, to acquire one or more second electronic images.

The method can further comprise: analyzing, using the processor, further electronic images acquired by the camera device after the first electronic image is acquired and before the one or more second electronic images are acquired; and, when the first electronic image comprises the given data and at least one of the further electronic images no longer comprises the given data, automatically controlling, using the processor, the camera device to acquire the one or more second electronic images.

The method can further comprise automatically controlling, using the processor, the camera device to acquire the one or more second electronic images by one or more of: acquiring a burst of electronic images; and, placing the camera device in a burst mode.

The method can further comprise automatically controlling, using the processor, the camera device to acquire the one or more second electronic images by one or more of: acquiring a video; and, placing the camera device in a video mode.

The given data can comprise one or more of: image data indicative that the camera device is obscured; an electronic image of a finger; a given range of colours; a given luminance level; and, one or more of a given percentage and a given portion of the first electronic image.

The device can further comprise a memory, and the method can further comprise storing, using the processor, at least one of the one or more second electronic images at the memory. The method can further comprise automatically deleting, using the processor, the first electronic image at the memory when previously stored therein.

The device can further comprise a notification device, and the method can further comprise controlling, using the processor, the notification device to provide a notification when the first electronic image comprising the given data is acquired.

The device can further comprise a display, and the method can further comprise visually identifying, using the processor, the given data in the first electronic image.

The device can further comprise an input device, and the method can further comprise controlling, using the processor, the camera device to acquire the first electronic image when input is received at the input device.

Yet a further aspect of the specification provides a computer program product, comprising a computer usable medium having a computer readable program code adapted to be executed to implement a method comprising: when a first electronic image acquired by a camera device, at a device comprising the camera device and a processor, comprises given data, automatically controlling the camera device, using the processor, to acquire one or more second electronic images. The computer usable medium can comprise a non-transitory computer usable medium.

FIG. 1 depicts a device 101 for detecting a camera obstruction, according to non-limiting implementations. Device 101 comprises: a housing 109; and a processor 120 interconnected with a camera device 121, a memory 122, a display 126, and an input device 128; device 101 can further comprise an optional communications interface 130, an optional microphone 132 and an optional speaker 134. Camera device 121 is configured to acquire at least one electronic image and comprises a sensor 139 for capturing and/or acquiring at least one electronic image and a lens system 140 for focusing light onto sensor 139, the focused light sensed by sensor 139 to capture and/or acquire electronic images.

As will be presently explained, processor 120 is generally configured to: when a first electronic image acquired by camera device 121 comprises given data, automatically control camera device 121 to acquire one or more second electronic images.

Device 101 can be any type of electronic device that can be used in a self-contained manner to acquire electronic images via camera device 121. Device 101 includes, but is not limited to, any combination of digital cameras, electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones smartphones, e-readers, internet-configured appliances and the like.

FIG. 1 further depicts a schematic diagram of device 101 according to non-limiting implementations. It should be emphasized that the structure of device 101 in FIG. 1 is purely an example, and contemplates a device that can be used for acquiring electronic images, wireless voice (e.g. telephony) and wireless data communications (e.g. email, web browsing, text, and the like). However, while FIG. 1 contemplates a device that can be used for both camera functionality and telephony, in other implementations, device 101 can comprise a device configured for implementing any suitable specialized functions, including but not limited to one or more of camera functionality, telephony, computing, appliance, and/or entertainment related functions.

Housing 109 generally houses processor 120, camera device 121, memory 122, display 126, input device 128, optional communications interface 130, optional microphone 132, optional speaker 134 and any associated electronics. Housing 109 can comprise any combination of metal, plastic, glass and like.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore memory 122 is also an example of a memory unit and/or memory module.

In particular, memory 122 stores at least one application 150, that, when processed by processor 120, enables processor 120 to: when a first electronic image acquired by camera device 121 comprises given data, automatically control camera device 121 to acquire one or more second electronic images.

At least one application 150 is an example of programming instructions stored at memory 122. For example, at least one application 150 can comprise a combination of a camera application and a camera obstruction detection application. In some implementations the camera application and the camera obstruction detection application can be combined, while in other implementations, the camera application and camera obstruction detection application can be distinct from one another. The camera application can be used to acquire electronic images using camera device 121, and the camera obstruction detection application can be used to detect a camera obstruction by analyzing the electronic images acquired by camera device 121, and automatically controlling camera device 121 to acquire one or more second electronic images, as described below.

Sensor 139 of camera device 121 generally comprises any device for acquiring electronic images, including but not limited to one or more of a camera device, a video device, a CMOS (complementary metal-oxide-semiconductor) image sensor, a CCD (charge-coupled device) image sensor and the like.

As best understood from FIG. 2, described below, in present implementations camera device 121 is configured to acquire images from a field of view facing away from the rear of device 101. However, the placement and/or field of view of camera device 121 are generally non-limiting: for example, camera device 121 could be located to acquire images in a field of view adjacent display 126. Indeed, in some implementations, device 101 can comprise more than one camera device 121 and/or more than one sensor similar to sensor 139 and/or more than one lens system similar to lens system 140, for acquiring images at more than one field of view. Further, images acquired by camera device 121 can comprise one or more of camera images, video images, video streams and the like.

In some implementations, camera device 121 can comprise an infrared sensor such that images comprise electronic infrared images and hence camera device 121 can function in low ambient lighting scenarios.

Lens system 140 can comprise one or more lenses and an optional focusing mechanism. In some implementations, lens system 140 can be modular and/or interchangeable, such that various lenses can be used with device 101. In other implementations, lens system 140 can be fixed but focusable, via a focusing mechanism. In yet further implementations camera device 121 comprises a sensor module and/or a camera module comprising sensor 139 and lens system 140. In some implementations, an external portion of lens system 140 can be flush with housing 109.

In addition to one or more lenses, lens system 140 can optionally comprise a focussing mechanism for changing the focal plane of camera device 121, including, but not limited to, any combination of voice coil actuators, piezoelectric motors, stepper motors, and the like.

Processor 120 is generally configured to control camera device 121 to acquire one or more electronic images, which can include, but is not limited to, storing one or more electronic images acquired by camera device 121 at memory 122. For example, when application 150 is being processed by processor 120, processor 120 can be configured to control camera device 121 to acquire one electronic image and store the electronic image at memory 122, for example when input data is received at input device 128. In some implementations, when processor 120 is processing application 150, camera device 121 can be capturing and/or acquiring electronic images one or more of continuously and periodically, and the electronic images can be displayed at display 126. However, an electronic image is not stored at memory 122 until input data is received at input device 128; in other words an electronic image is not stored at memory 122 until a physical and/or virtual shutter button is actuated and/or a shutter command is executed.

In some implementations, processor 120 can control camera device 121 to acquire electronic images in a burst mode, in which a plurality of electronic images are acquired by camera device 121, and stored at memory 122, in rapid succession. In yet further implementations, processor 120 can control camera device 121 to acquire electronic images in a video mode, in which a plurality of electronic images are acquired by camera device 121, and stored at memory 122, in a video stream.

Processor 120 can also be configured to communicate with a display 126, and optionally microphone 132 and speaker 134. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, display 126 and input device 128 can be combined into one apparatus. While optional, microphone 132 is configured to receive sound data, and speaker 134 is configured to provide sound data, audible alerts, audible communications, and the like, at device 101. In some implementations, input device 128 and display 126 are external to device 101, with processor 120 in communication with each of input device 128 and display 126 via a suitable connection and/or link.

Processor 120 can also control one or more of display 126 and speaker 134 to provide visual and/or aural notifications. In some implementations, device 101 can further comprise one or more of a notification device, a visual indicator (for example an LED (light emitting diode), a light and the like), and/or a haptic device (e.g. a vibration device) that can also be configured to provide visual and/or haptic notifications.

In optional implementations, as depicted, processor 120 also connects to communication interface 130, which is implemented as one or more radios and/or connectors and/or network adaptors, configured to wirelessly communicate with one or more communication networks (not depicted). In these implementations, communication interface 130 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When communication interface 130 is configured to communicate with one or more communication networks, communication interface 130 can comprise further protocol specific antennas therefore (not depicted).

While not depicted, device 101 further comprises one or more power sources, including but not limited to a battery and/or a connection to an external power source, including, but not limited to, a main power supply.

In any event, it should be understood that in general a wide variety of configurations for device 101 are contemplated.

Figure 2:
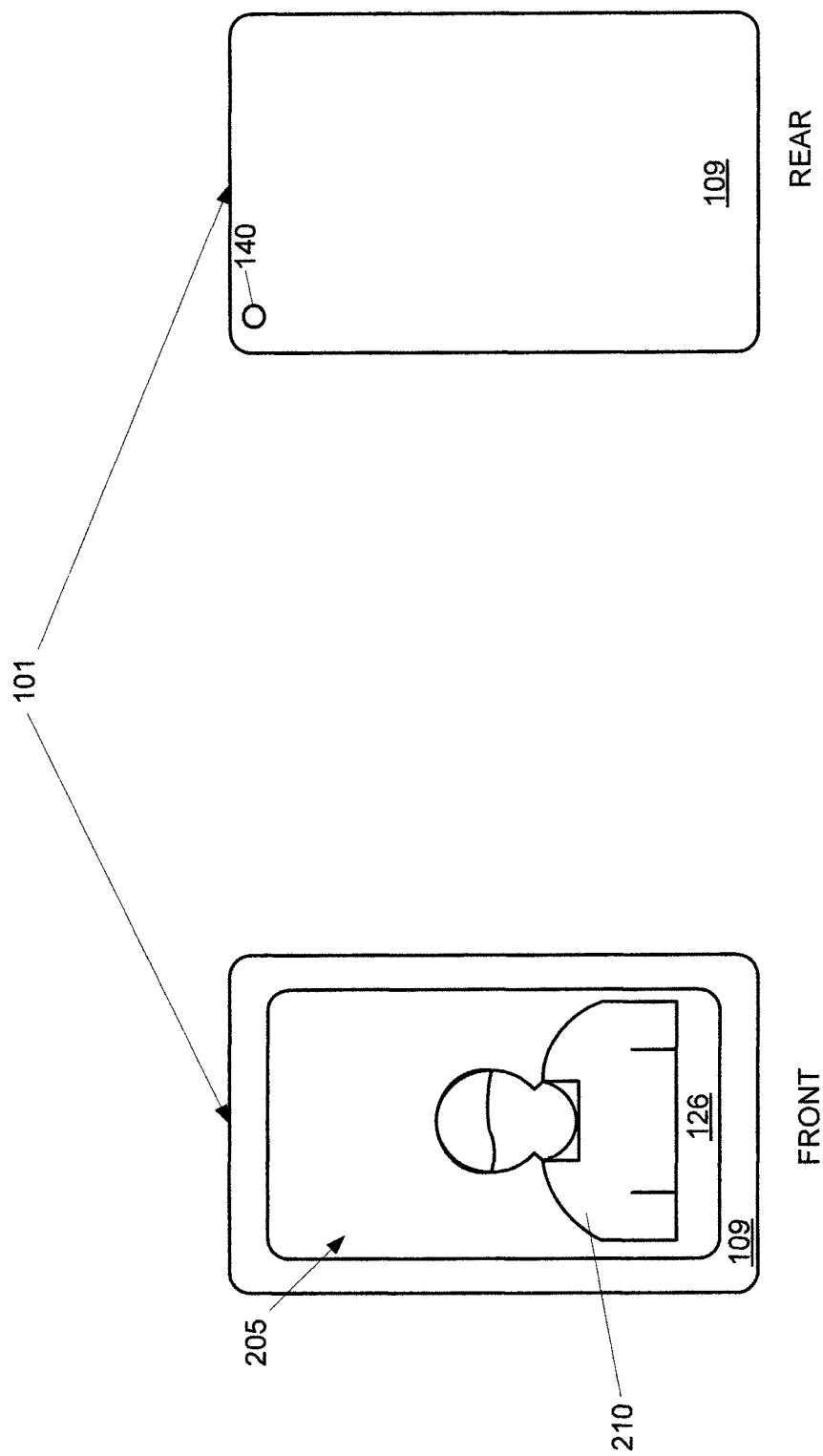
FIG. 2 depicts front and rear perspective views of the device of FIG. 1, according to non-limiting implementations.

Attention is next directed to FIG. 2, which depicts front and rear perspective views of device 101, according to non-limiting implementations. From FIG. 2, it is apparent that camera device 121 is configured to acquire electronic images 205 of a field of view at a rear of device 101. It is further apparent that device 101 is in a camera mode (e.g. application 150 is being processed by processor 120) such that electronic images 205 acquired by camera device 121 are rendered at display 126, including a feature 210. Further, while present implementations are described with reference to one feature 210, present implementations are not so limited, and can include any number of features in a field of view of camera device 121.

Not all images acquired via camera device 121 are stored at memory 122: indeed, electronic images 205 provided at display 126 can comprise a series of electronic images and/or a video stream, representing features in a field of view of camera device 121, and a specific electronic image is not acquired until a physical and/or virtual shutter button is actuated and/or a shutter command is executed.

It is further appreciated that only an external portion of camera device 121 is depicted in FIG. 2, for example, one or more lenses of lens system 140. In present implementations, an external portion of lens system 140 is located at a corner of device 101, and further an external portion of lens system 140 is flush with housing 109 as best appreciated with reference to the rear view of device 101 in FIG. 2. This can increase the likelihood of camera device 121 (e.g. lens system 140) being obscured.

Figure 3:
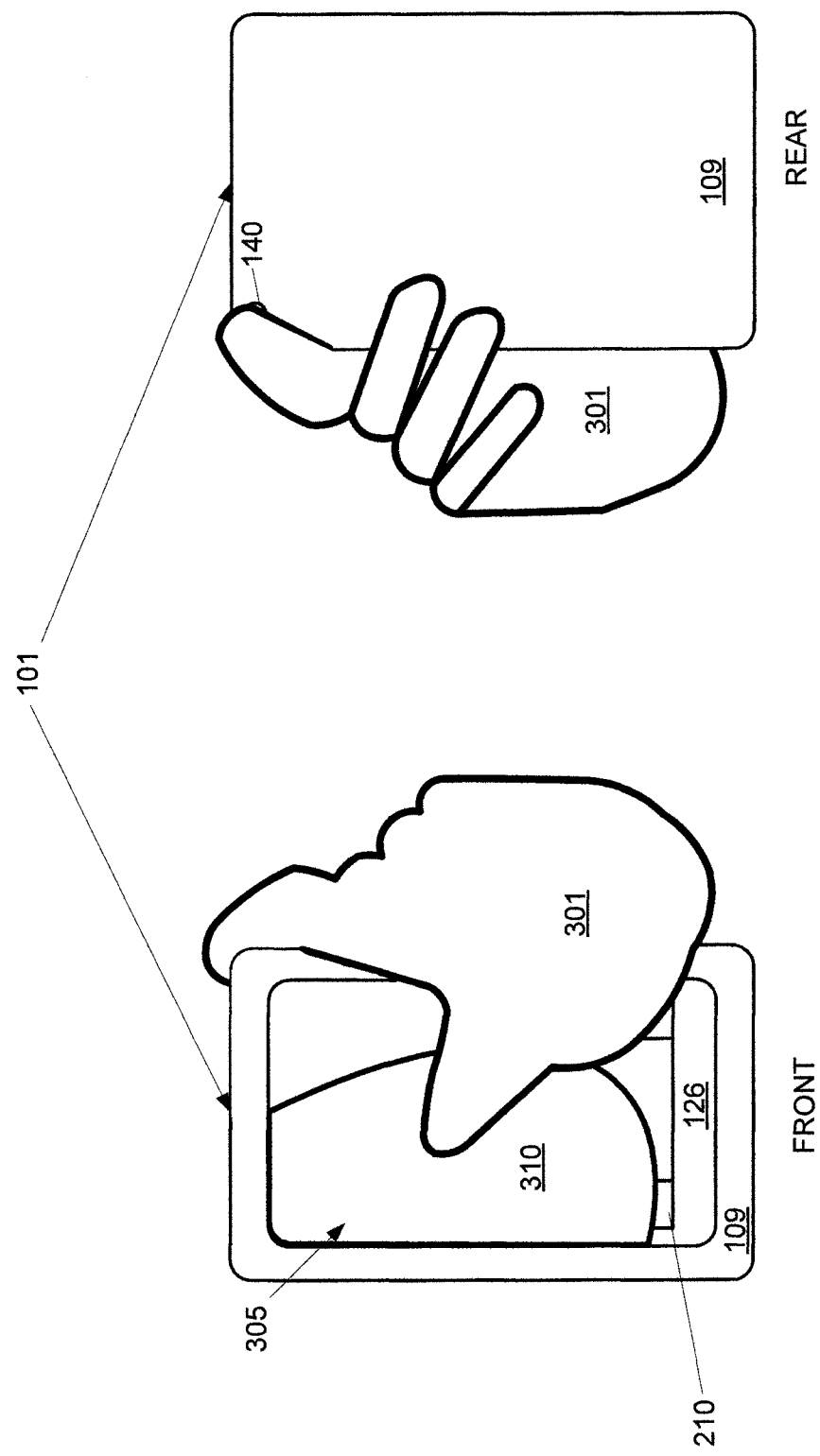
FIG. 3 depicts front and rear perspective views of the device of FIG. 1 when a camera device is obstructed, according to non-limiting implementations.

For example, attention is next directed to FIG. 3, which is substantially similar to FIG. 2, with like elements having like numbers. However, in these implementations, device 101 is being held by a hand 301, and a finger of hand 301 is at least partially covering lens system 140 (e.g. see rear view of device 101 in FIG. 3). Hence, an electronic image 305, different from electronic image 205, is provided at display 126. Specifically, electronic image 305 comprises feature 210 and another feature 310 obscuring at least a portion of feature 210, feature 310 comprising an electronic image of at least a portion of the finger of hand 301, which is obscuring lens system 140 of camera device 121.

Figure 4:
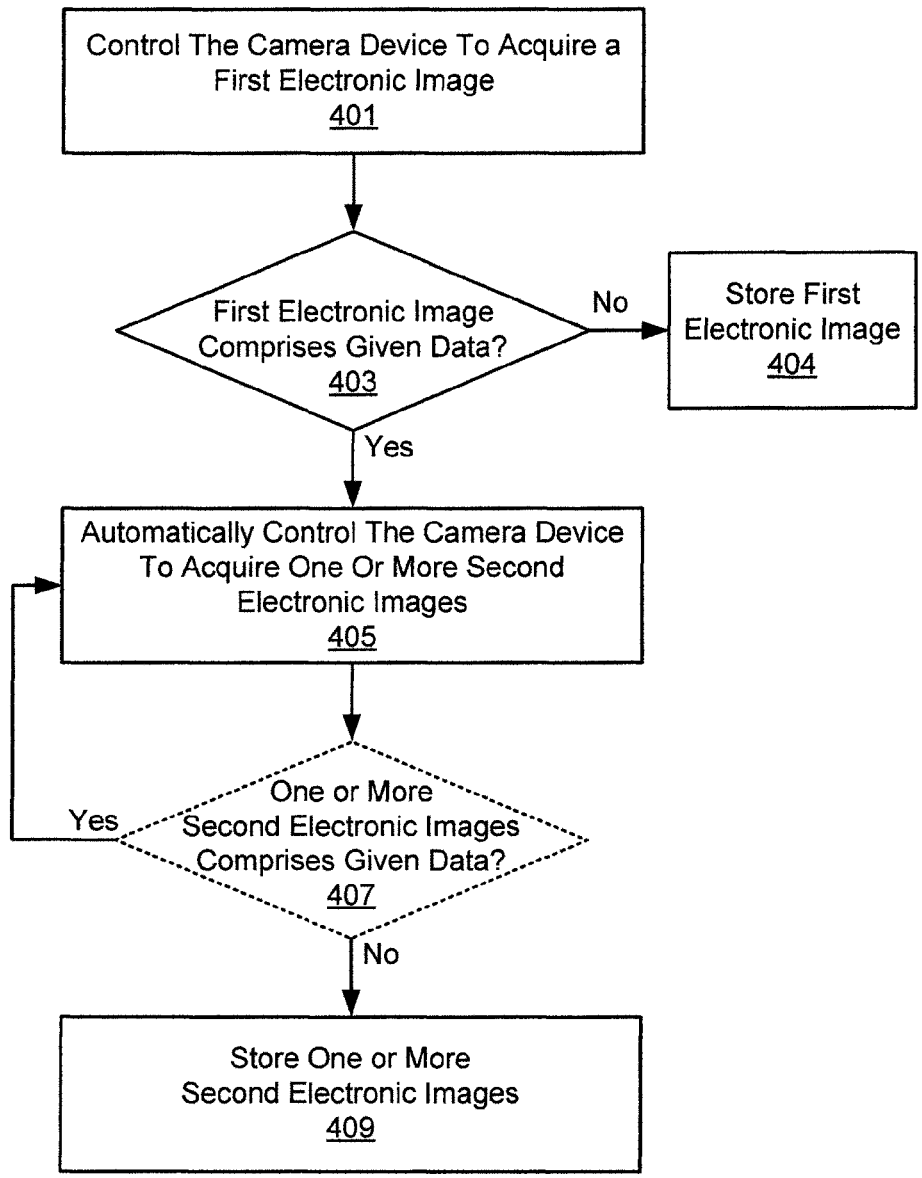
FIG. 4 depicts a block diagram of a flow chart of a method for detecting a camera obstruction and responding to the camera obstruction according to non-limiting implementations.

Attention is now directed to FIG. 4 which depicts a flowchart illustrating a method 400 for detecting a camera obstruction and responding to the camera obstruction, according to non-limiting implementations. In order to assist in the explanation of method 400, it will be assumed that method 400 is performed using device 101. Furthermore, the following discussion of method 400 will lead to a further understanding of device 101 and its various components. However, it is to be understood that device 101 and/or method 400 can be varied, and need not work exactly as discussed herein in conjunction with each other, and that such variations are within the scope of present implementations. It is appreciated that, in some implementations, method 400 is implemented in device 101 by processor 120.

It is to be emphasized, however, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood that method 400 can be implemented on variations of device 101 as well.

At block 401, processor 120 controls camera device 121 to acquire a first electronic image, for example, when input is received at input device 128. In example implementations, the first electronic image can comprise electronic image 305 of FIG. 3, which includes feature 310 (i.e. an electronic image of at least a portion of a finger of hand 301).

At block 403, processor 120 determines whether the first electronic image comprises given data. The given data can include, but is not limited to, one or more of: image data indicative that camera device 121 is obscured; an electronic image of a finger; a given range of colours; a given luminance level; and, one or more of a given percentage and a given portion of the first electronic image. In other words, at block 403, when the first electronic image comprises the given data, lens system 140 of camera device 121 can be obscured.

Block 403 can be implemented by processor 120 using image analysis techniques and/or image recognition techniques to determine that the first electronic image comprises image data indicative that camera device 121 is obscured, which can include, but is not limited to, an image of at least a portion of a finger and/or images associated with lens system 140 of camera device 121 being obscured.

Alternatively, memory 122 can store one or more sets of image data associated with images of fingers (e.g. in extreme close-up) for comparison with the first electronic image by processor 120.

Alternatively, processor 120 can analyze the first electronic image to determine whether at least a portion of the first electronic image comprises any of a given range of colours and/or given luminance levels associated with lens system 140 of camera device 121 being obscured, for example by a finger, In some implementations, processor 120 can analyze first electronic image to determine whether one or more of a given percentage and a given portion of the first electronic image comprises an image associated with lens system 140 of camera device 121 being obscured, for example by a finger. The given percentage and/or given portion can comprise, for example, about 10% of the first electronic image, such that when processor 120 determines that camera device 121 comprises the given data when about 10% of the first electronic image comprises the given data. However, it is appreciated that 10% is provided merely as an example and that any suitable percentage, for example about 5% and higher, is within the scope of present implementations. Further, while the given percentage and given portion is specified with reference to percentages, the given percentage and given portion can be specified in other ways, for example as fractions and the like.

In any event, any of a wide range of techniques for analyzing the first electronic image to determine whether lens system 140 of camera device 121 is obscured are within the scope of present implementations.

When the first electronic image acquired by camera device 121 does not comprise the given data (i.e. a "No" decision at block 403), at block 404, the first electronic image can be stored, for example at memory 122. In other words, lens system 140 of camera device 121 not being obscured results in a "No" decision at block 403.

In some implementations, the first electronic image is stored at memory 122 regardless of a decision at block 403.

When the first electronic image acquired by camera device 121 comprise the given data (i.e. a "Yes" decision at block 403), at block 405, processor 120 automatically controls camera device 121 to acquire one or more second electronic images. For example, the first electronic image can comprise electronic image 305 which comprises feature 310 that is an electronic image of at least a portion of a finger.

In other words, lens system 140 of camera device 121 being obscured results in a "Yes" decision at block 403, and camera device 121 automatically acquires at least one further second electronic image.

At an optional block 407, processor 120 determines whether the one or more second electronic images comprise the given data. When so (i.e. a "Yes" decision at optional block 407), block 405 is repeated. In other words, block 405 is repeated until one or more second electronic images no longer comprises the given data (i.e. until camera device 121 is no longer obscured).

At block 409 (which can occur when a "No" decision occurs at optional block 407, and/or after block 405 and/or in parallel with block 405), the one or more electronic images are stored, for example at memory 122.

Method 400 can be further understood by comparing electronic images 205, 305. As described above, electronic image 305 is a non-limiting example of the first electronic image acquired by camera device 121 at block 401; hence, electronic image 205, which is lacking feature 310, is a non-limiting example of the one or more second electronic images. In other words, in the context of method 400, electronic image 305 can be acquired first and, when device 101 determines that electronic image 305 comprises feature 310, camera device 121 is controlled to acquire at least one further electronic image, for example until electronic image 205 is acquired and/or until camera device 121 is no longer obscured.

Non-limiting implementations of method 400 are now described with reference to FIGS. 5 to 8, each of which is substantially similar to FIG. 1, with like elements having like numbers.

Figure 5:
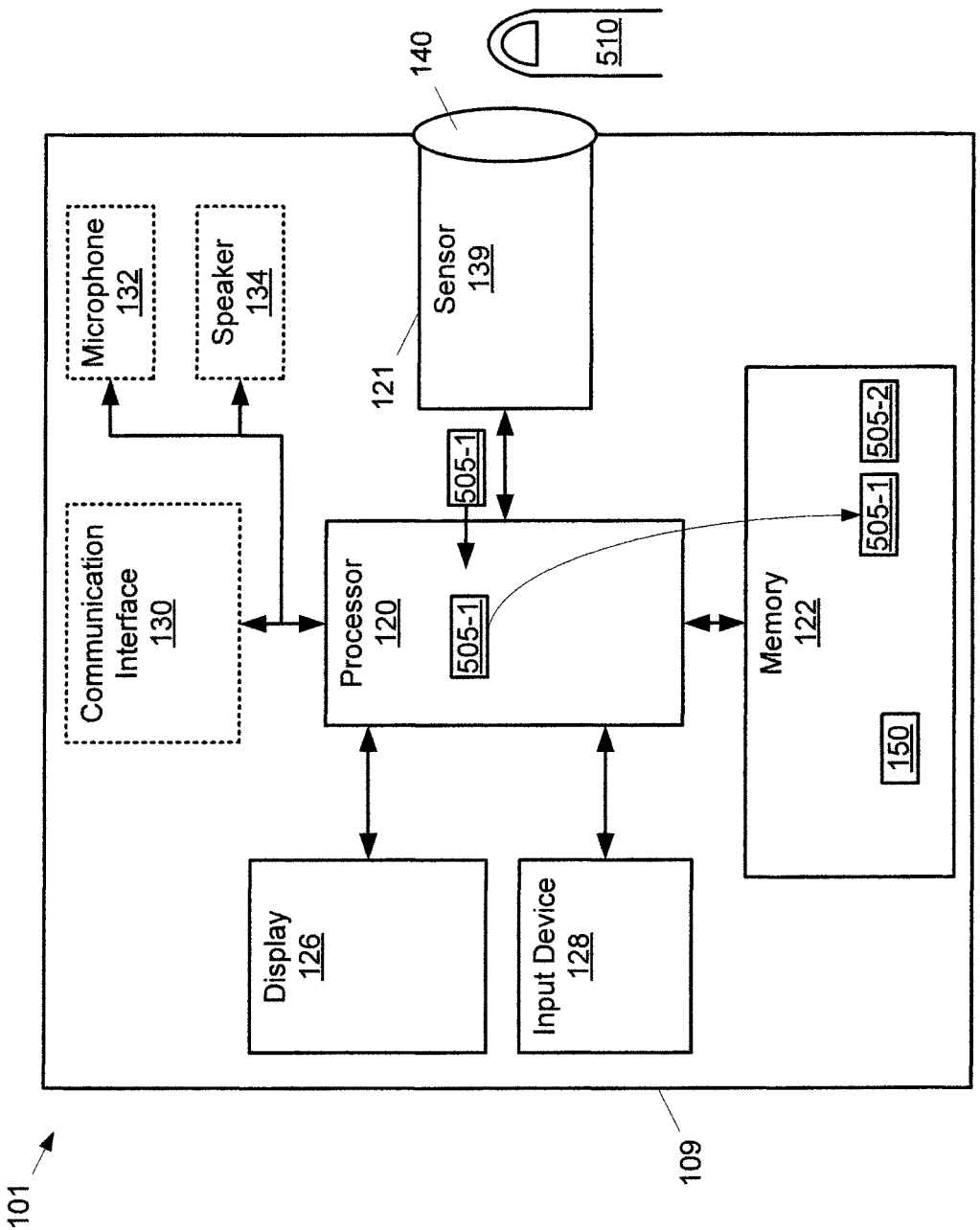
FIG. 5 depicts the device of FIG. 1 acquiring a first electronic image when a camera device is obstructed, according to non-limiting implementations.

In any event, attention is next directed to FIG. 5 where camera device 121 is depicted as acquiring a first electronic image 505-1 when a finger 510 is blocking lens system 140 (i.e. block 401). As depicted, first electronic image 505-1 is optionally stored at memory 122.

Figure 6:
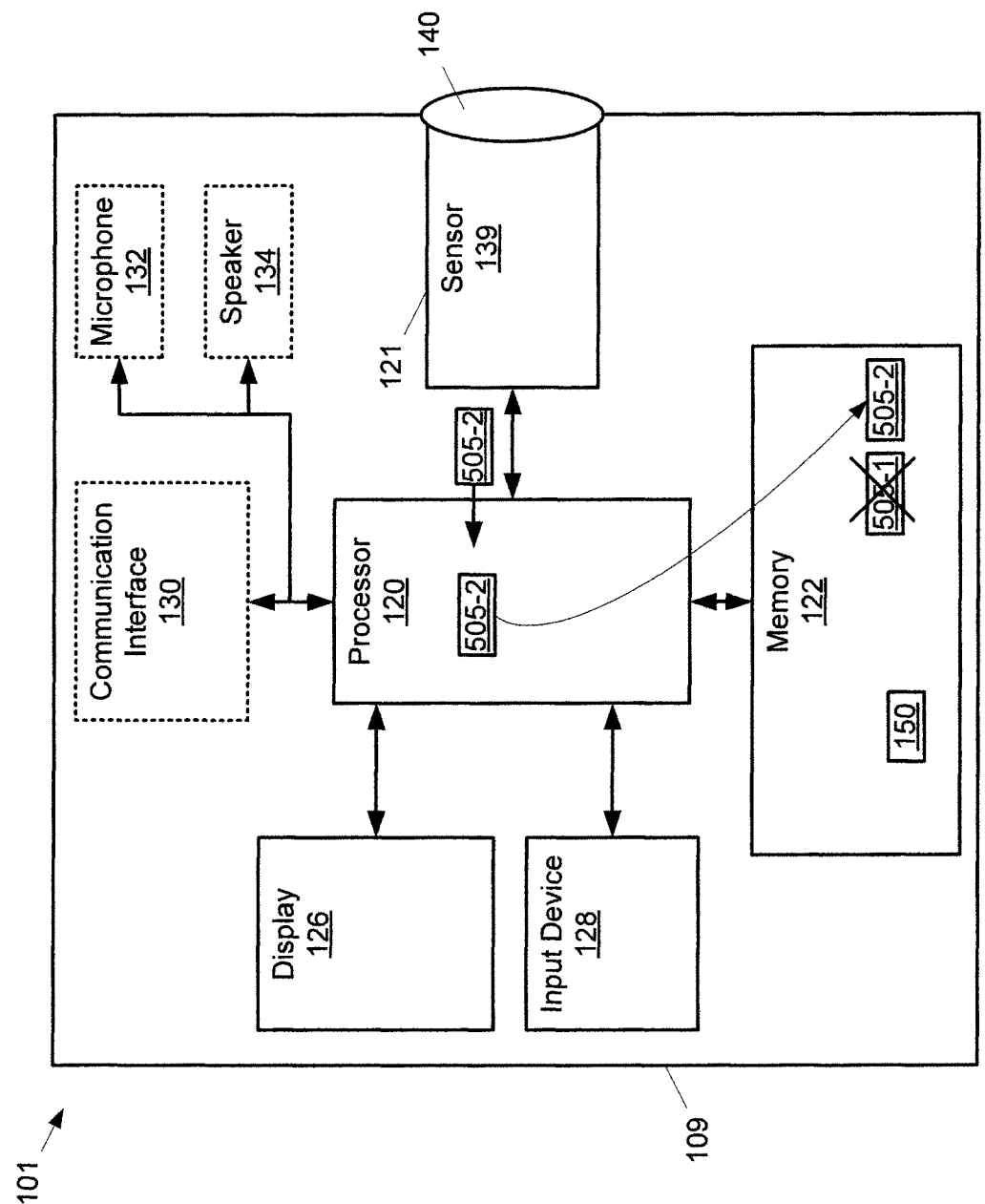
FIG. 6 depicts the device of FIG. 1 acquiring a second electronic image in response to the camera device being obstructed, according to non-limiting implementations.

It is further appreciated that, at block 403, processor 120 determines that first electronic image 505-1 comprises the given data (e.g. representative of camera device 121 being obscured) and, with reference to FIG. 6, at block 405, processor 120 automatically controls camera device 121 to acquire a second electronic image 505-2. As depicted, in FIG. 6, finger 510 is no longer obscuring lens system 140 of camera device 121, and hence second electronic image 505-2 does not comprise the given data (e.g. representative of camera device 121 being obscured). As depicted, processor 120 is further configured to store second electronic image 505-2 at memory 122, and optionally automatically delete first electronic image 505-1 at memory 122 when previously stored therein. However, in other implementations, first electronic image 505-1 is not deleted.

Further, in other implementations, more than one second electronic image 505-2 is acquired, for example two or more second electronic images 505-2.

In some implementations, after a "Yes" decision at block 403, processor 120 analyzes further electronic images acquired by camera device 121 after first electronic image 505-1 is acquired and before one or more second electronic images 505-2 are acquired at block 405; and, when first electronic image 505-1 comprises the given data and at least one of the further electronic images no longer comprises the given data, processor 120 automatically controls camera device 121 to acquire one or more second electronic images 505-2. The one or more further electronic images are not stored at memory 122, but can comprise a video stream from camera device 121 which is not stored.

In other words, after a "Yes" decision at block 403, processor 120 monitors electronic images acquired by camera device 121 and, when camera device 121 is no longer obscured and/or at least one of the further electronic images no longer comprises an image of a finger obscuring lens system 140 of camera device 121, one or more second electronic images 505-2 are acquired and stored. In some of these implementations, one or more second electronic images 505-2 can comprise one or more of the further electronic images acquired by camera device 121 when processor 120 is monitoring the further electronic images to determine when the camera is no longer obscured.

However, in some of these implementations, processor 120 monitors and/or analyzes the further electronic images for one or more of a given time period, for example less than about 10 seconds and/or until input data is received at input device 128. Processor 120 then one or more of: stops monitoring/analyzing the further electronic images; acquires and/or store one or more second electronic images 505-2 using camera device 121; and/or exits application 150.

Hence, method 400 can be implemented in one or more different modes at device 101. For example, in some implementations, optional block 407 is not implemented and only one further second electronic image is acquired at block 407 as depicted in FIGS. 5 and 6.

In yet a further mode, processor 120 can be further configured to automatically control camera device 121 to acquire one or more second electronic images (i.e. at block 405) by one or more of: acquiring a burst of electronic images; and, placing camera device 121 in a burst mode. In other words, when processor 120 determines at block 403 that the first electronic image comprises the given data, camera device 121 is placed in a burst mode and a given number of second electronic images are acquired by camera device 121 in a burst.

Figure 7:
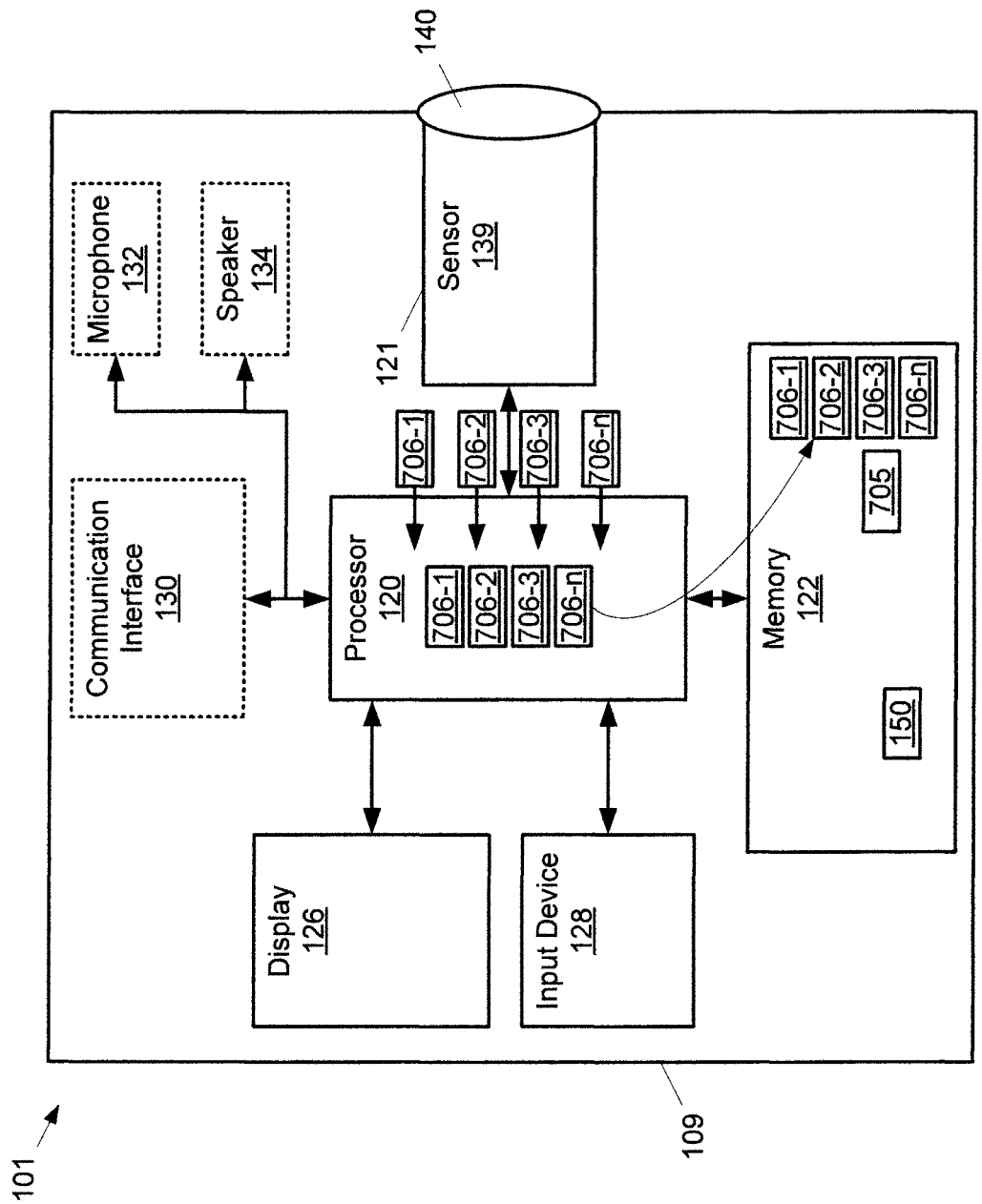
FIG. 7 depicts the device of FIG. 1 acquiring second electronic images in a burst mode, in response to the camera device being obstructed, according to non-limiting implementations.

For example attention is next directed to FIG. 7 which depicts device 101 in burst mode operation; it is assumed in FIG. 7 that a first electronic image 705 has been acquired at block 401 (and optionally stored at memory 122) and that at block 403, processor 120 has determined that first electronic image 705 comprises the given data. At block 405, camera device 121 is placed in a burst mode and a burst of second electronic images 706-1, 706-2, 706-3 ... 706-n are acquired and stored at memory 122. Second electronic images 706-1, 706-2, 706-3 ... , 706-n will be interchangeably referred to hereafter as, collectively, second electronic images 706 and generically as a second electronic image 706. Second electronic images 706 may or may not include the given data (e.g. indicative that camera device 121 is obscured); in other words, the burst of second electronic images 706 can be acquired regardless of whether camera device 121 continues to be obscured after first electronic image 705 is acquired. Further, while a number "n" of second electronic images 706 are depicted as being acquired, the burst of second electronic images 706 can include any suitable number of second electronic images 706, for example from two second electronic images 706 to ten or more second electronic images 706. The number of second electronic images 706 acquired in a burst can be configurable at application 150, for example by using a pull-down menu and receiving input data at input device 128 indicative of a selection of a number of second electronic images 706 to be acquired in a burst.

After second electronic images 706 are acquired, second electronic images 706 can be manually reviewed using display 126 and input device 128, and second electronic images 706 that are not desired can be manually deleted. Alternatively, processor 120 can analyze second electronic images 706 after they are acquired and stored and delete one or more of second electronic images 706 that comprise the given data indicative of camera device 121 being obscured.

In yet a further mode, processor 120 can be further configured to automatically control camera device 121 to acquire one or more second electronic images (i.e. at block 405) by one or more of: acquiring a video; and, placing camera device 121 in a video mode. In other words, when processor 120 determines at block 403 that the first electronic image comprises the given data, camera device 121 is placed in a video mode and a given number of second electronic images are acquired by camera device 121 in a video.

Figure 8:
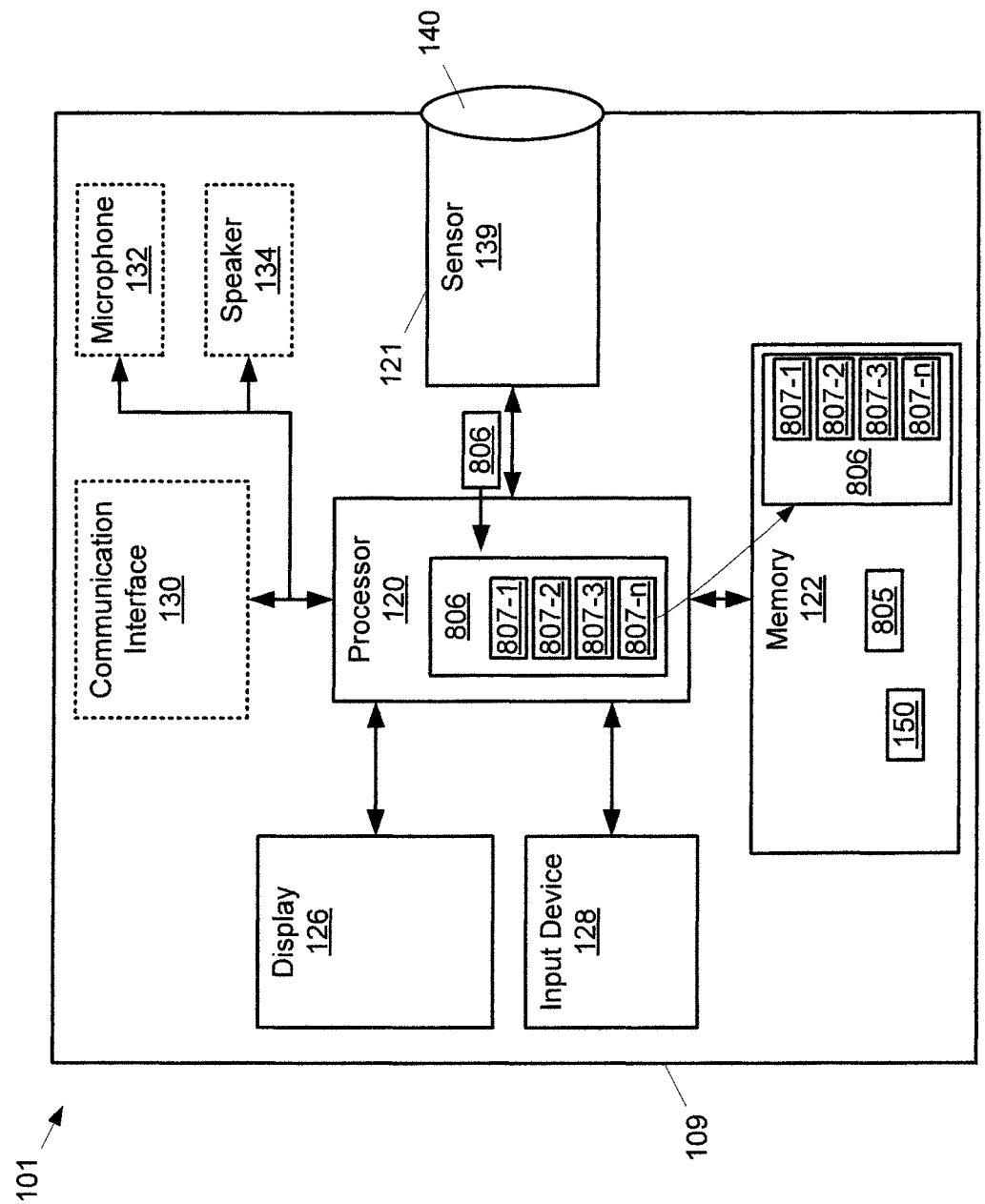
FIG. 8 depicts the device of FIG. 1 acquiring second electronic images in a video mode, in response to the camera device being obstructed, according to non-limiting implementations.

For example, attention is next directed to FIG. 8 which depicts device 101 in video mode operation; it is assumed in FIG. 8 that a first electronic image 805 has been acquired at block 401 (and optionally stored at memory 122) and that at block 403, processor 120 has determined that first electronic image 805 comprises the given data. At block 405, camera device 121 is placed in a video mode and video 806 is acquired that includes second electronic images 807-1, 807-2, 807-3 . . . 807-$n$; second electronic images 807-1, 807-2, 807-3 . . . 807-$n$ will be interchangeably referred to hereafter as, collectively, second electronic images 807 and generically as a second electronic image 807. Video 806 is further stored at memory 122.

Second electronic images 807 may or may not include the given data (e.g. indicative that camera device 121 is obscured); in other words, video 806, which includes second electronic images 807, can be acquired regardless of whether camera device 121 continues to be obscured after first electronic image 805 is acquired. Further, while a number "n" of second electronic images 807 are depicted as being acquired in video 806, video 806 can include any suitable number of second electronic images 807, and/or video 806 can be of any suitable length, for example about a few seconds. The length of video 806 and/or number of second electronic images 807 acquired in video 806 can be configurable at application 150, for example by using a pull-down menu and receiving input data at input device 128 indicative of a selection of a length of video 806 and/or a number of second electronic images 807 to be acquired in a burst.

In any event, after second electronic images 807 are acquired, second electronic images 807 can be manually reviewed using display 126 and input device 128, and second electronic images 807 that are not desired can be manually deleted. Alternatively, second electronic images 807 can be combined to produce a final electronic image using editing software, for example to combine desirable features from two or more of second electronic images 807. Alternatively, processor 120 can analyze second electronic images 807 after they are acquired and stored, and delete one or more of second electronic images 807 that comprise the given data indicative of camera device 121 being obscured.

Figure 9:
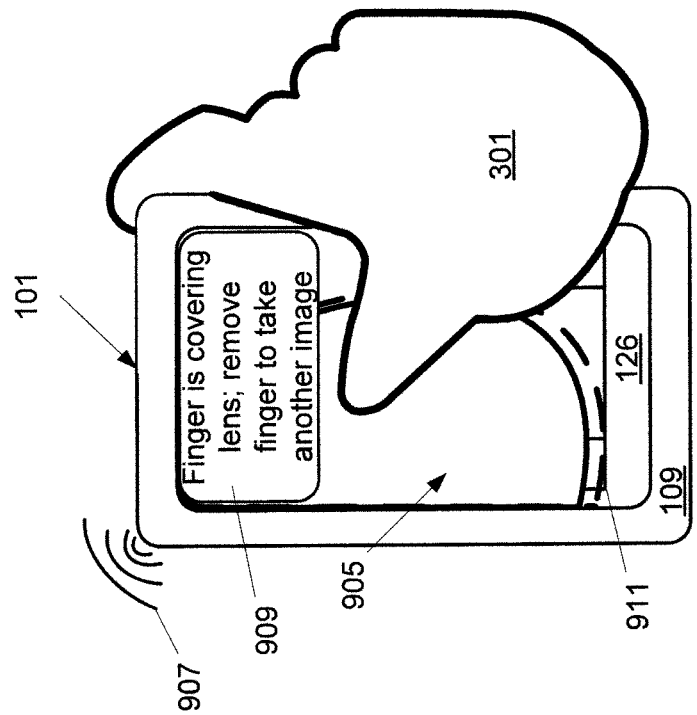
FIG. 9 depicts a front perspective view of the device of FIG. 1 providing notifications in response to the camera device being obstructed, according to non-limiting implementations.

As described above, in some implementations, device 101 can comprise a notification device, which can include, but is not limited to, one or more of display 126 and speaker 134. Hence, attention is next directed to FIG. 9, which is substantially similar to the front view of device 101 depicted in FIG. 3, with like elements having like numbers, however in FIG. 9 a first electronic image 905 (similar to electronic image 305) is displayed at display 126. In FIG. 9, when first electronic image 905 is acquired, and processor 120 determines that first electronic image 905 comprises the given data (i.e. a "Yes" decision occurs at block 403), a notification device at device 101, for example, one or more of speaker 134, a visual indicator, a vibration device, and the like provides an aural and/or haptic notification 907 to indicate that camera device 121 is obscured. Further, processor 120 controls display 126 to provide a visual notification 909 that camera device 121 is obscured (i.e. text displayed on first electronic image 905).

As depicted, visual notification 909 also indicates that when the finger is removed from lens system 140, one or more second electronic images will be acquired. Hence, in some non-limiting implementations, from a user perspective, removal of their finger from lens system 140 triggers the acquiring of the one or more second electronic images. For example, in these implementations, as described above, processor 120 is further configured to analyze further electronic images acquired by camera device 121 after first electronic image 905 is acquired and before one or more second electronic images are acquired; and, when first electronic image 905 comprises the given data and at least one of the further electronic images no longer comprises the given data, automatically control camera device 121 to acquire the one or more second electronic images.

In any event, as depicted in FIG. 9, processor 120 can be further configured to control a notification device to provide a notification when first electronic image 905 comprising the given data is acquired.

As further depicted in FIG. 9, processor 120 can be further configured to visually identify the given data in first electronic image 905. For example, an outline 911 and/or highlight of an image of a finger of hand 301 in first electronic image 905 can be provided to draw attention to the finger.

However, each of notifications 907, 909 and outline 911 can be optional and/or combined with placing camera device 121 into a burst mode or a video mode. For example, when camera device 121 is placed in a burst mode or a video mode (and/or prior to camera device 121 being placed in a burst mode or a video mode), one or more of notifications 907, 909 and outline 911 can be provided to notify a user to remove a finger from lens system 140 of camera device 121 and/or stop obscuring camera device 121.

In yet further alternative implementations, blocks 401 and 403 can occur in parallel and processor 120 can control speaker 134 to provide a specialized shutter notification, indicative of camera device 121 being obscured (similar to one or more of notifications 907, 909), as first electronic image 905 is acquired and/or shortly thereafter.

Provided herein is a device configured to determine when a camera device is being obscured when an electronic image is being acquired, and proactively respond to the camera device being obscured by acquiring at least one further electronic image. In some implementations, the device can monitor further electronic images from the camera device and acquire the one or more second images once the camera device is no longer obscured. Such a device can be particularly useful when the device is a mobile electronic device and/or mobile communications device where small lens systems are used and hence are particularly easy to obscure; further, as mobile electronic devices proliferate, usage patterns involving camera devices have developed where people take hundreds and/or thousands of pictures over short periods of time, which in turn causes people to be generally lazy and/or unskilled when framing images; hence obscuring of a camera device in these situations has become more likely, a problem that is mitigated by present implementations.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave infrared, free-space optical or other transmission schemes) or a combination thereof.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A device comprising:
    a camera device;
    a memory; and,
    a processor configured to:
        control the camera device to acquire a first electronic image;
        analyze the first electronic image;
        when the first electronic image comprises image data indicative that the camera device is obscured: automatically control the camera device to acquire one or more second electronic images; store the one or more second electronic images in the memory; and automatically delete the first electronic image at the memory when previously stored therein; and,
        when the first electronic image does not comprise the image data indicative that the camera device is obscured, store the first electronic image at the memory without acquiring the one or more second electronic images.

2. The device of claim 1, wherein the processor is further configured to:
    analyze further electronic images acquired by the camera device after the first electronic image is acquired and before the one or more second electronic images are acquired; and, when the first electronic image comprises the image data indicative that the camera device is obscured and at least one of the further electronic images no longer comprises the image data indicative that the camera device is obscured: automatically control the camera device to acquire the one or more second electronic images; store the one or more second electronic images in the memory; and automatically delete the first electronic image at the memory when previously stored therein.

3. The device of claim 1, wherein the processor is further configured to automatically control the camera device to acquire the one or more second electronic images by one or more of:
    acquiring a burst of electronic images; and,
    placing the camera device in a burst mode.

4. The device of claim 1, wherein the processor is further configured to automatically control the camera device to acquire the one or more second electronic images by one or more of:
    acquiring a video; and,
    placing the camera device in a video mode.

5. The device of claim 1, wherein the image data indicative that the camera device is obscured comprises one or more of:
    an electronic image of a finger;
    a given range of colours;
    a given luminance level; and,
    one or more of a given percentage and a given portion of the first electronic image.

6. The device of claim 1, further comprising a notification device, and the processor is further configured to control the notification device to provide a notification when the first electronic image comprising the image data indicative that the camera device is obscured is acquired.

7. The device of claim 1, further comprising a display and the processor is further configured to visually identify the image data indicative that the camera device is obscured in the first electronic image.

8. The device of claim 1, further comprising an input device, and the processor is further configured to control the camera device to acquire the first electronic image when input is received at the input device.

9. A method comprising:
    controlling, using a processor of a device, a camera device to acquire a first electronic image, the device comprising: the camera device, a memory, and the processor;
    analyzing, using the processor, the first electronic image;
    when the first electronic image comprises image data indicative that the camera device is obscured: automatically controlling, using the processor, the camera device to acquire one or more second electronic images; storing, using the processor, the one or more second electronic images in the memory; and automatically deleting, using the processor, the first electronic image at the memory when previously stored therein; and,
    when the first electronic image does not comprise the image data indicative that the camera device is obscured, storing, using the processor, the first electronic image at the memory without acquiring the one or more second electronic images.

10. The method of claim 9, further comprising:
    analyzing, using the processor, further electronic images acquired by the camera device after the first electronic image is acquired and before the one or more second electronic images are acquired; and, when the first electronic image comprises the image data indicative that the camera device is obscured and at least one of the further electronic images no longer comprises the image data indicative that the camera device is obscured: automatically controlling, using the processor, the camera device to acquire the one or more second electronic images; storing, using the processor, the one or more second electronic images in the memory; and automatically deleting, using the processor, the first electronic image at the memory when previously stored therein.

11. The method of claim 9, further comprising automatically controlling, using the processor, the camera device to acquire the one or more second electronic images by one or more of:
   acquiring a burst of electronic images; and,
   placing the camera device in a burst mode.

12. The method of claim 9, further comprising automatically controlling, using the processor, the camera device to acquire the one or more second electronic images by one or more of:
   acquiring a video; and
   placing the camera device in a video mode.

13. The method of claim 9, wherein the image data indicative that the camera device is obscured comprises one or more of:
   an electronic image of a finger;
   a given range of colours;
   a given luminance level; and,
   one or more of a given percentage and a given portion of the first electronic image.

14. The method of claim 9, wherein the device further comprises a notification device, and the method further comprises controlling, using the processor, the notification device to provide a notification when the first electronic image comprising the image data indicative that the camera device is obscured is acquired.

15. The method of claim 9, wherein the device further comprises a display, and the method further comprises visually identifying, using the processor, the image data indicative that the camera device is obscured in the first electronic image.

16. The method of claim 9, wherein the device further comprises an input device, and the method further comprises controlling, using the processor, the camera device to acquire the first electronic image when input is received at the input device.

17. A computer program product, comprising a non-transitory computer usable medium having a computer readable program code adapted to be executed to implement a method comprising:
   controlling, using a processor of a device, a camera device to acquire a first electronic image, the device comprising: the camera device, a memory, and the processor;
   analyzing, using the processor, the first electronic image;
   when the first electronic image comprises image data indicative that the camera device is obscured: automatically controlling, using the processor, the camera device to acquire one or more second electronic images; storing, using the processor, the one or more second electronic images in the memory; and automatically deleting, using the processor, the first electronic image at the memory when previously stored therein; and,
   when the first electronic image does not comprise the image data indicative that the camera device is obscured, storing, using the processor, the first electronic image at the memory without acquiring the one or more second electronic images.

\* \* \* \* \*